US008635247B1

(12) United States Patent
Klinkner et al.

(10) Patent No.: US 8,635,247 B1
(45) Date of Patent: Jan. 21, 2014

(54) NAMESPACE AND STORAGE MANAGEMENT APPLICATION INFRASTRUCTURE FOR USE IN MANAGEMENT OF RESOURCES IN A STORAGE SYSTEM ENVIRONMENT

(75) Inventors: Steven R. Klinkner, Fremont, CA (US); Brian M. Hackworth, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1200 days.

(21) Appl. No.: 11/414,593

(22) Filed: Apr. 28, 2006

(51) Int. Cl.
*G06F 7/00* (2006.01)
*G06F 17/30* (2006.01)

(52) U.S. Cl.
USPC ........................................ 707/783

(58) Field of Classification Search
USPC ................. 707/1, 3, 10, 783; 718/1
See application file for complete search history.

(56) References Cited

U.S. PATENT DOCUMENTS

| 5,689,701 | A * | 11/1997 | Ault et al. ................... 707/10 |
| 5,742,806 | A * | 4/1998 | Reiner et al. ................... 707/3 |
| 6,061,743 | A * | 5/2000 | Thatcher et al. .............. 719/328 |
| 6,438,600 | B1 * | 8/2002 | Greenfield et al. ........... 709/229 |
| 6,668,327 | B1 * | 12/2003 | Prabandham et al. ............ 726/4 |
| 6,721,777 | B1 * | 4/2004 | Sharma ........................ 718/101 |
| 7,082,600 | B1 * | 7/2006 | Rau et al. ..................... 717/148 |
| 7,210,131 | B2 | 4/2007 | Schmidt et al. |
| 7,313,560 | B2 | 12/2007 | Dilley et al. |
| 7,337,197 | B2 | 2/2008 | Wilson et al. |
| 2002/0010783 | A1 | 1/2002 | Primak et al. |
| 2002/0054051 | A1 * | 5/2002 | Ladd ............................. 345/700 |
| 2002/0116454 | A1 * | 8/2002 | Dyla et al. ..................... 709/203 |
| 2002/0147696 | A1 * | 10/2002 | Acker et al. ....................... 707/1 |
| 2002/0156932 | A1 * | 10/2002 | Schneiderman .............. 709/317 |
| 2003/0033240 | A1 * | 2/2003 | Balson et al. ................... 705/37 |
| 2003/0195870 | A1 * | 10/2003 | Newcombe et al. .............. 707/3 |
| 2004/0068572 | A1 * | 4/2004 | Wu .............................. 709/229 |
| 2004/0078397 | A1 | 4/2004 | Mehta et al. |
| 2004/0122917 | A1 | 6/2004 | Menon et al. |
| 2004/0267830 | A1 | 12/2004 | Wong et al. |
| 2005/0015761 | A1 * | 1/2005 | Chang et al. ................... 717/174 |
| 2005/0044423 | A1 * | 2/2005 | Mellmer et al. .............. 713/201 |
| 2005/0125503 | A1 * | 6/2005 | Iyengar et al. ................ 709/213 |
| 2005/0154731 | A1 | 7/2005 | Ito et al. |
| 2005/0210033 | A1 * | 9/2005 | Newcombe et al. ............ 707/10 |
| 2005/0210074 | A1 | 9/2005 | Nakatani et al. |
| 2005/0240654 | A1 | 10/2005 | Wolber et al. |
| 2006/0036570 | A1 * | 2/2006 | Schaefer et al. .................. 707/1 |
| 2006/0122955 | A1 * | 6/2006 | Bethlehem et al. .............. 707/1 |
| 2006/0123062 | A1 | 6/2006 | Bobbitt et al. |

(Continued)

OTHER PUBLICATIONS

Arnold et al., The Java Programming Language Second Edition, 1998, Addison Wesley, Chapter 1, 2, 9, 10, 15, 17.*

(Continued)

*Primary Examiner* — Rehana Perveen
*Assistant Examiner* — Huen Wong
(74) *Attorney, Agent, or Firm* — Cesari and McKenna, LLP (57) ABSTRACT

A namespace and storage management (NSM) application includes an infrastructure configured to enable efficient management of resources in a storage system environment. The NSM application executes on a NSM console and interacts with an NSM server to integrate namespace management and storage management in the storage system environment. The NSM server, in turn, interacts with one or more remote agents installed on host machines in the environment to convey application programming interface (API) function calls that enable remote management of the resources.

15 Claims, 5 Drawing Sheets

(56) References Cited

U.S. PATENT DOCUMENTS

2006/0143608 A1* 6/2006 Dostert et al. ............ 718/1
2007/0038697 A1* 2/2007 Zimran et al. ............ 709/203
2007/0055703 A1 3/2007 Zimran et al.
2007/0198458 A1* 8/2007 Pudipeddi ............ 707/1

OTHER PUBLICATIONS

Pitt et al., Java.rmi The Remote Method Invocation Guide, Jul. 18, 2001, Addison Wesley, Chapters 6 & 13.*
Fischer, JNDI Unleashed, May 29, 2000, Quantum Enterprise Solutions, Inc.*
Sun Microsystems, RMI Registry Service Provider for the Java Naming and Directory Interface (JNDI), 2001, Sun Microsystems.*
Farley et al., Java Enterprise in a Nutshell, 3rd Edition, Nov. 22, 2005.*
Sun Microsystems, JNDI Service Providers, Jun. 4, 2004, Sun Microsystems.*
Perrone et al., Java Naming and Directory Service Interfaces, Oct. 1999, Assured Technologies, Inc.*
Sun Microsystems, The JNDI Tutorial, 2003, Sun Microsystems.*
Sun Microsystems, JNDI Java Naming & Directory Interface, May 2005, Sun Microsystems.*
Grosso, Java RMI, Oct. 29, 2001, Oreilly, Chapter 15.*
Microsoft, "Microsoft® Computer Dictionary", Mar. 2002, Microsoft Press, 5$^{th}$ Edition.*
Balasubramanian et al., System and Method for Data Migration Management in a Logical Namespace of a Storage System Environment, U.S. Appl. No. 11/384,776, filed Mar. 20, 2006, 37 pages.
DCE 1.2.2 DFS Administration Guide and Reference, 1997, published by The Open Group, 1997, 1187 pages.
DataFabric® Manager 3.2 Administration Guide, 1994-2004, published by Network Appliance, Inc., Sep. 2005, 564 pages.
Kishore et al., System and Method for Integrating Namespace Management and Storage Management in a Storage System Environments, U.S. Appl. No. 11/384,711, filed Mar. 20, 2006, 41 pages.
VFM™ (Virtual File Manager) Reference Guide, Version 3.0, 2001-2003, 197 pages.
VFM™ (Virtual File Manager) Getting Started Guide, Version 3.0, 2001-2003, 62 pages.
Balasubramanian et al., Migration Engine for Use in a Logical Namespace of a Storage System Environment, U.S. Appl. No. 11/384,804, filed Mar. 20, 2006, 38 pages.
Moons, Herman et al., *Location-Independent Object Invocation in Open Distributed Systems*, Autumn 1991 EurOpen Technical Conference and Exhibition, pp. 287-300 (Sep. 16-20, 1991).

* cited by examiner

NAMESPACE AND STORAGE MANAGEMENT APPLICATION INFRASTRUCTURE FOR USE IN MANAGEMENT OF RESOURCES IN A STORAGE SYSTEM ENVIRONMENT

CROSS-REFERENCE TO RELATED APPLICATION

The present invention is related to the following commonly assigned U.S. patent application Ser. No. 11/384,804 titled, System and Method for Integrating Namespace Management and Storage Management in a Storage System Environment, filed Mar. 20, 2006, which application is hereby incorporated by reference.

FIELD OF THE INVENTION

The present invention relates to storage systems, and more specifically, to an application infrastructure for use in management of resources in a storage system environment.

BACKGROUND OF THE INVENTION

A storage system typically comprises one or more storage devices into which information may be entered, and from which information may be obtained, as desired. The storage system includes an operating system that functionally organizes the system by, inter alia, invoking storage operations in support of a storage service implemented by the system. The storage system generally provides its storage services through the execution of software modules, such as processes. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage system may be further configured to operate according to a client/server model of information delivery to thereby allow many clients to access information stored on the system. In this model, the storage system may be embodied as file server executing an operating system, such as the Microsoft® Windows™ operating system (hereinafter "Windows operating system"). Furthermore, the client may comprise an application executing on an operating system of a computer that "connects" to the server over a computer network, such as a point-to-point link, shared local area network, wide area network, or virtual private network implemented over a public network, such as the Internet. Each client may request the services of the server by issuing storage access protocol messages (in the form of packets) to the server over the network. By supporting a plurality of storage (e.g., file-based) access protocols, such as the conventional Common Internet File System (CIFS) and the Network File System (NFS) protocols, the utility of the server is enhanced.

To facilitate client access to the information stored on the server, the Windows operating system typically exports units of storage, e.g., (CIFS) shares. As used herein, a share is equivalent to a mount point or shared storage resource, such as a folder or directory that stores information about files or other directories served by the file server. A Windows client may access information in the directory by mounting the share and issuing a CIFS protocol access request that specifies a uniform naming convention (UNC) path to the share. The UNC path or pathname is an aspect of a Windows networking environment that defines a way for a client to refer to a unit of storage on a server. The UNC pathname is prefixed with the string \\ to indicate resource names on a network. For example, a UNC pathname may comprise a server name, a share (directory) name and a path descriptor that collectively reference a unit of storage or share. Thus, in order to access the share, the client typically requires knowledge of the specific physical location (i.e., the identity) of the server exporting the share.

Instead of requiring the client to provide the specific identity of the file server exporting the share, it is desirable to only require a logical pathname to the share. That is, it is desirable to provide the client with a globally unique pathname to the share without reference to the file server. The conventional Distributed File System (DFS) namespace service provides such a solution in a Windows environment through the creation of a namespace that removes the specificity of server identity. DFS is well-known and described in *DCE 1.2.2 DFS Administration Guide and Reference*, 1997, which is hereby incorporated by reference. As used herein, a namespace is a view of shared storage resources (such as shares) from the perspective of a client. The DFS namespace service is generally implemented using one or more DFS servers and distributed components in a network.

Using the DFS service, it is possible to create a unique pathname (in the form of a UNC pathname) for a storage resource that a DFS server translates to an actual location of the resource (share) in the network. However, in addition to the DFS namespace provided by the Windows operating system, there are many other namespace services provided by various operating system platforms, including the NFS namespace provided by the conventional Unix® operating system. Each service constructs a namespace to facilitate management of information using a layer of indirection between a file server and client accessing a shared storage resource (share) on the server. For example, a share may be connected or "linked" to a link point (link in DFS terminology or a mount point in NFS terminology) to hide the machine specific reference to the share. By referencing the link point, the client can automatically access information on the storage resource of the specific machine. This allows an administrator (user) to store the information on any server in the network by merely providing a reference to the information (or share). However, these namespaces are typically services created on heterogeneous server platforms, which leads to incompatibility and non-interoperability with respect to management of the namespaces by the user. For example, the DFS namespace service is generally limited to Windows-based operating system platforms, whereas the NFS namespace service is generally limited to Unix-based operating system platforms.

The Virtual File Manager (VFM™) developed by NuView, Inc. and available from Network Appliance, Inc., ("NetApp") provides a namespace service that supports various protocols operating on various file server platforms, such as NetApp filers and DFS servers. The VFM namespace service is well-known and described in *VFM™ (Virtual File Manager) Reference Guide, Version 4.0*, 2001-2003, and *VFM™ (Virtual File Manager) Getting Started Guide, Version 4.0*, 2001-2003.

A large-scale storage system environment may include many (e.g., hundreds of) storage systems hosting resources embodied as, e.g., storage and namespace objects. As used herein, namespace objects include namespaces, link points and shares, whereas storage objects include servers, files, and disks. In order to perform namespace and storage management in such a large-scale storage system environment, it is desirable to provide a management application executing on a management console that enables users to manage multiple storage system resources efficiently, e.g., as one or more groups of managed objects. In addition, it is desirable to provide a management application that allows users to efficiently operate on these groups of objects simultaneously.

Often, users are required to provide appropriate credentials (e.g., user name and password) in order to access the storage system resources for purposes of performing operations thereon. Conventional management consoles are generally limited in their abilities to dynamically acquire such credentials when needed, i.e., "on-demand". As a result, the user credentials are typically previously acquired and stored for use by the consoles, thereby requiring expensive persistent storage capabilities on the management consoles. Accordingly, it is further desirable to provide a management application executing on a management console that enables users to provide their credentials as needed (on-demand) when accessing storage system resources.

SUMMARY OF THE INVENTION

The disadvantages of the prior art are overcome by providing a namespace and storage management (NSM) application having an infrastructure configured to enable efficient management of resources in a storage system environment. The NSM application executes on a NSM console and interacts with an NSM server to integrate namespace management and storage management in the storage system environment. The NSM server, in turn, interacts with one or more remote agents installed on host machines in the environment to convey application programming interface (API) function calls (hereinafter "APIs") that enable remote management of the resources. Notably, the NSM application (and NSM console) cooperates with the NSM server and remote agent to create an integrated management framework that provides an underlying infrastructure that supports various heterogeneous storage access protocols within a single, logical namespace service.

According to one aspect of the invention, the NSM application infrastructure comprises one or more client presentation layers disposed over a library layer that is embodied as graphical user interface (GUI) and API components. To facilitate support for various client presentation layers, the library layer is apportioned into a GUI toolkit configured to produce reusable GUI components and an API toolkit configured to produce reusable API components that, in the illustrative embodiment, are directed to namespace and storage management functions. The API toolkit handles thread management as well as API processing and communication with the NSM server, whereas the GUI components and their implementations are handled by the client presentation layer and GUI toolkit.

According to another aspect of the invention, the API toolkit comprises an API client layer, a managed object layer, a thread pool layer and a credential handling layer. The API client layer illustratively embodies an API library configured to generate APIs used to interact with the NSM server. The managed object layer illustratively provides a plurality of templates that describes data and behavior associated with instances of managed objects, as well as interfaces that enable operations on those objects. The thread pool layer utilizes a plurality of worker threads to process an operation that is apportioned among the threads into manageable APIs directed to the managed objects. The credential handling layer provides, among other things, a credential collection function that collects user credentials needed to access the resources "on-demand".

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage System Environment

Figure 1:
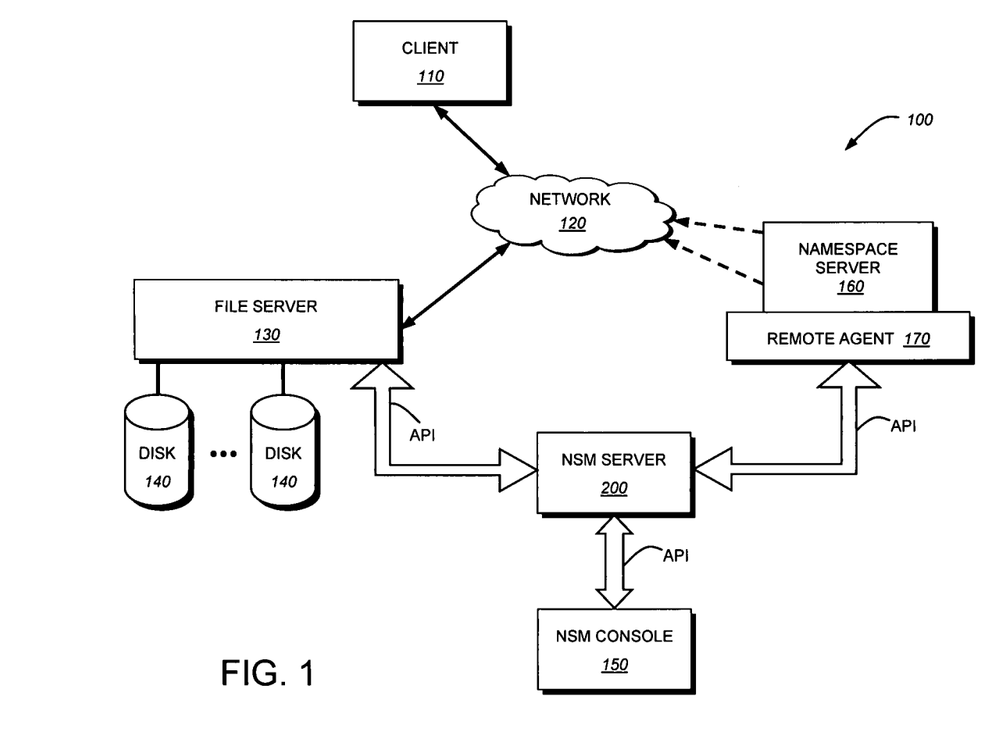
FIG. 1 is a schematic block diagram of an exemplary storage system environment that may be advantageously used with the present invention.

FIG. 1 is a schematic block diagram of an exemplary storage system environment 100 that may be advantageously used with the present invention. The storage system environment comprises a plurality of storage systems configured to provide storage services relating to information stored on storage devices, such as disks 140. The storage systems include file servers 130 executing operating systems such as, e.g., the Microsoft® Windows™ operating system (hereinafter "Windows operating system"), the Unix® operating system and the NetApp® Data ONTAP™ operating system available from Network Appliance, Inc., Sunnyvale, Calif. One or more clients 110 may connect to the file servers over a computer network 120, such as a point-to-point link, shared local area network, wide area network, or virtual private network implemented over a public network, such as the Internet.

Each client 110 may comprise an application executing on an operating system of a general-purpose computer that interacts with the file servers 130 in accordance with a client/server model of information delivery. That is, the client may request the services of a server, and the server may return the results of the services requested by the client, by exchanging packets over the network 120. The client may issue packets including storage (e.g., file-based) access protocols, such as the Common Internet File System (CIFS) protocol or Network File System (NFS) protocol, over the Transmission Control Protocol/Internet Protocol (TCP/IP) when accessing information in the form of, e.g., files and directories.

To facilitate client access to the information stored on the server, a file server 130 executing, e.g., the Windows operating system typically exports units of storage, e.g., (CIFS) shares. A client 110 may access information of the share by mounting the share and issuing a CIFS protocol access request that specifies a uniform naming convention (UNC) path to the share. Although the illustrative embodiment is directed to a Windows file server that is accessed using the CIFS protocol, the invention described herein is not so limited and may also apply to other servers 130, such as Unix file servers and NetApp filers, that are accessible using other file access protocols, such as the NFS protocol. The client connects to file server 130 when accessing the share, typically by specifying the IP address (or identity) of the file server.

However, instead of requiring that the client know the specific identity of the server in order to access the share, a namespace server 160, such as the conventional Distributed File System (DFS) server, provides a namespace service that removes the specificity of server identity. Using the DFS service, a unique pathname (in the form of a UNC pathname) is created for the share that the DFS server translates to an actual location of the share in the network. For example, assume a client application issues a CIFS request to access information of a share stored on a file server 130 in the environment 100. The request is passed through various layers of the client's operating system including, e.g., a CIFS redirector. Before issuing a CIFS packet directed to a UNC pathname specified by the client application, the redirector contacts the DFS server to determine whether there is a different, actual pathname needed to access the information. If so, the DFS server returns that actual pathname to the redirector, which then uses that pathname to create the CIFS packet for transmission over the network. The DFS namespace service thus provides a level of indirection to a share that resides on a file server 130 in the environment 100.

Although the illustrative embodiment is directed to a DFS namespace service provided by the Windows operating system executing on a DFS server, the invention dew scribed herein is not limited and may also apply to other namespace services, such as the NFS namespace provided by the Unix operating system executing on a conventional Name Information Service (NIS) server. Each service constructs a namespace to facilitate management of information using a layer of indirection between a file server 130 and client 110 accessing a shared storage resource (share) on the server. However, these namespace services are created on heterogeneous server platforms, which lead to incompatibility and non-interoperability with respect to management of different namespaces by, e.g., an administrator (user).

In the illustrative embodiment, a namespace and storage management (NSM) server 200 is provided that integrates namespace management and storage management in storage system environment 100. The NSM server 200 includes an integrated management framework that provides an underlying infrastructure that supports various heterogeneous storage access protocols within a single, logical namespace service. To that end, the NSM server cooperates with a NSM console 150 and a remote agent 170 to create the integrated management framework. The integrated management framework, in turn, allows the NSM server 200 to interact with any namespace server, such as a DFS server configured to handle CIFS protocol requests or a NIS server configured to handle NFS protocol requests, directed to namespace services.

Figure 2:
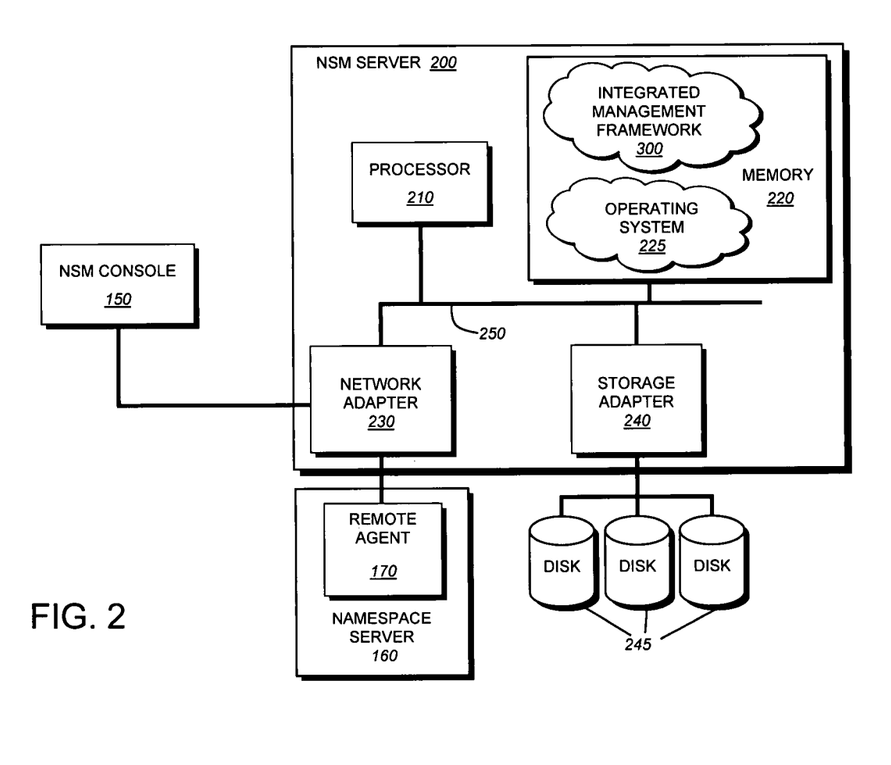
FIG. 2 is a schematic block diagram of an exemplary namespace and storage management server that may be advantageously used with the present invention.

FIG. 2 is a schematic block diagram of an exemplary namespace and storage management (NSM) server 200 that may be advantageously used with the present invention. The NSM server illustratively comprises a processor 210, a memory 220, a network adapter 230 and a storage adapter 240 interconnected by a system bus 250. The memory 220 may comprise storage locations addressable by the processor and adapters for storing software programs, i.e., specific sets of ordered operations, and data structures associated with the invention. The processor and adapters may, in turn, comprise processing elements and/or logic circuitry configured to execute the programs and manipulate the data structures. In particular, the storage adapter 240 comprises the mechanical, electrical and signaling circuitry needed to connect the server to storage devices, such as disks 245. Similarly, the network adapter 230 comprises the mechanical, electrical and signaling circuitry needed to connect the server 200 to, e.g., the NSM console 150 and remote agent 170.

An operating system 225, portions of which is typically resident in memory 220 and executed by the processing elements, functionally organizes the server by, inter alia, invoking operations in support of storage services implemented by the server. In the illustrative embodiment, the operating system is preferably the Windows operating system, although it is expressly contemplated that any appropriate operating system, such as the Unix operating system, may be enhanced for use in accordance with the inventive principles described herein. The operations invoked by the operating system are illustratively namespace and storage operations in support of an integrated management framework 300 provided by the server. It will be apparent to those skilled in the art that other processor and memory means, including various computer readable media, may be used for storing and executing program instructions pertaining to the invention described herein.

B. Integrated Management Framework

Figure 3:
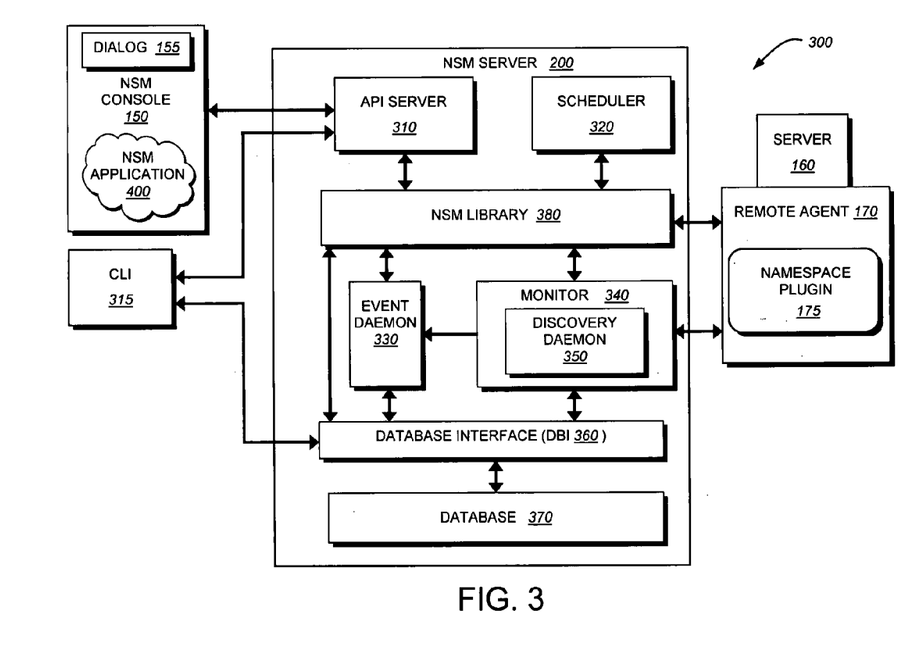
FIG. 3 is a schematic block diagram of an integrated management framework that to may be advantageously used with the present invention.

The NSM server 200 generally provides its storage services through the execution of software modules, such as processes. These services are illustratively implemented as separately-scheduled processes (and/or daemons) that execute in user space of operating system 225 to provide the integrated management framework 300. As used herein, a process refers to an instance of a program being executed by, e.g., the processor and a thread is an instance of a sequence of the process's program code. FIG. 3 is a schematic block diagram of the integrated management framework 300 that may be advantageously used with the present invention. The integrated management framework 300 provides a logical namespace service that is based on extensions to underlying storage management technology and other technological components. Notably, these extensions are embodied as library functionality.

In the illustrative embodiment, the underlying storage management technology is embodied as DataFabric® Manager (DFM) technology available from Network Appliance, Inc., Sunnyvale, Calif. and described in *DataFabric® Manager 3.2 Administration Guide,* 1994-2004, which is hereby incorporated by reference. Broadly stated, the DFM technology comprises a set of coordinating processes, including an application programming interface (API) server 310, a scheduler 320, an Event daemon 330, a Monitor 340 including a Discovery daemon 350 and a database interface (DBI) 360 configured to interact with an embedded database 370. The capabilities of these processes are extended to create the integrated namespace and storage management framework 300 through the addition of NSM library functionality 380. The NSM library 380 is illustratively implemented as various library modules, each of which provides namespace and storage management actions embodied as APIs.

The integrated management framework 300 exposes a set of interfaces, e.g., an API interface that is used by the NSM console 150 and a command line interface (CLI 315), used by a communication protocol. Illustratively, the communication protocol is embodied as an XML over HTTP mechanism for APIs, primarily because of its ability to describe data conveyed over the network, as well as the transport, without describing the actual storage access protocol. An example of a communication protocol that may be advantageously used with the present invention is the ZAPI protocol available from Network Appliance, Inc. Such a protocol is also easily extensible and flexibly agnostic to binary formats of specific servers and clients to thereby operate efficiently in a heterogeneous environment.

In the illustrative embodiment, the integrated management framework 300 facilitates configuration and management of pathnames in the logical namespace. That is, the underlying infrastructure of the framework allows a user to manage various pathnames exported by heterogeneous namespace service and protocol implementations within the logical namespace. This aspect of the framework involves creation of a layer of abstraction that presents to a client a notion of the logical namespace that is accessible via a particular storage access protocol. As noted, the various heterogeneous namespace services are not interoperable with respect to user management; the integrated framework 300 extracts logical "views" (e.g., pathnames) from the namespaces exported by the heterogeneous services, stores those pathnames in database 370, and then configures the pathnames so that they are accessible in the logical namespace via the storage access protocol.

In storage and networking environments, some operations can only be executed if a user (such as a system administrator) is logged into a server on which the operations are to be performed, e.g., the NSM server. In other words, a remote operation that is to be invoked on the server 200 can only be performed if the user is logged into the server. The NSM console 150 and remote agent 170 of the integrated management framework 300 address this problem. Illustratively, the NSM console 150 is a component of the framework that executes an NSM application 400 having a JAVA-based interface and the remote agent 170 is a software module installed on a host machine, such as a server 160, which manages a particular namespace, e.g., a DFS server. Using the communication protocol, the NSM console issues APIs to the NSM server which, in turn, issues APIs that are invoked on the remote agent to perform actions requested by the user.

Essentially, the remote agent 170 is a thin web server that includes "programmatic glue" to enable installation of plug-in modules ("plug-ins"). An example of a plug-in is a namespace management module 175 that allows remote access and management of data (e.g., pathnames) by the NSM server 200. Notwithstanding the particular namespace, the integrated management framework 300 involves installation of a remote agent 170 on a server 160 that manages the particular namespace and interacts with the NSM server 200 via APIs exposed by the remote agent.

Illustratively, the remote agent 170 is installed on a machine that hosts a DFS server of a Windows/DFS environment. The namespace management plug-in module 175 may, in turn, be installed on the remote agent to enable communication with the NSM server 200 when accessing namespace information stored on the DFS server. Specifically, the NSM server issues APIs in connection with the communication protocol to instruct the remote agent 170 to perform certain actions. For example, in order to construct or change pathnames in the logical namespace, a user interacts with the NSM console 150 to access that namespace by, in effect, invoking a set of APIs on the NSM server 200 which, in turn, invokes a set of APIs on the remote agent 170. Once the NSM server has cooperated with the DFS server to construct the pathnames, those servers are no longer involved in client data accesses.

It should be noted that the underlying directory data structures used in the logical namespace reside on the namespace server 160 providing the particular namespace service, such as a DFS server. That is, the namespace server 160 implements the basic is namespace; the NSM server 200 provides a service for configuring that namespace. To that end, the NSM server 200 cooperates with the remote agent 170 to acquire a copy of the namespace directory structures from the namespace server 160 and stores the copy on the embedded database 370. The NSM server then cooperates with the NSM console 150 to allow a user to manipulate (configure) the copy. Once configuration is complete, the server 200 cooperates with the remote agent to "push" (store) the manipulated copy of directory structures back to the namespace server 160.

The Monitor 340 is illustratively embodied as a multi-threaded process having a collection of individual monitor threads, each of which is scheduled by the scheduler 320. The Monitor 340 cooperates with the remote agent 170 to communicate with one or more machines/devices in the storage system environment 100 (using SNMP, RSH, etc) to collect any type of storage or data/namespace object information (e.g., volume and/or qtree information, as well as information about namespace servers) available in the environment and, to that end, functions as a data collector. Illustratively, each monitor thread is configured to collect information about a particular object in the environment. Extensions to the Monitor described herein are directed to namespace and agent management, each of which is illustratively embodied as an individual monitor thread.

As data is collected, the Monitor 340 determines whether it needs to notify any processes of some resulting condition. For example, an individual monitor thread may detect a threshold and the occurrence of some type of event. As used herein, an event is a synchronous notification with a severity attribute. By configuring thresholds, the NSM server 200 can determine when an event occurs. If a threshold is exceeded, the Monitor 340 communicates with the Event daemon 330 to notify it of that event. Thus, the Monitor 340 is configured to detect certain events and, in response, generate event notifications to the Event daemon 330. The Event daemon 330 then determines what (if any) further action is needed (e.g., send an SMTP alert, an email, an SNMP trap) and records the event in the embedded database 370.

The embedded database 370 is illustratively implemented as a Sybase relational database that exports a set of Structured Query Language (SQL) function calls that enable storage/retrieval of data, such as namespace objects, to/from the database. A schema of the database is configured to efficiently capture characteristics of a namespace independent of the storage access protocol, such as NFS or CIFS. The database 370 is illustratively organized as a plurality of tables, each of which can be accessed by processes within the NSM server. The DBI 360 is illustratively embodied as a SQL interface to the database and its associated tables, although it will be understood to those skilled in the art that the DBI may be embodied as any other type of database protocol interface depending on the actual implementation of the database, e.g., an Oracle database.

The API server 310 is illustratively embodied as a multi-threaded process that is configured to implement the APIs used by the NSM console 150 to access the database 370 and manipulate information stored thereon. The API server 310 also implements the communication protocol APIs used to interact with the remote agent 170. Accordingly, extensions to the API server 310 are primarily directed to those APIs required to manipulate the database and the remote agent. For example, APIs are invoked by a user (via the NSM console 150) to manipulate (modify, update) the embedded database 370. The API server 310 updates the database with respect to user configuration requests and the Monitor 340 periodically queries (polls) the database for any state/information change. Depending upon the change, the API server may cooperate with the Monitor to instruct data collection from the remote agent 170. After receiving the collected information from the remote agent, the Monitor 340 updates the database and the Event daemon 330.

C. NSM Application Infrastructure

Figure 4:
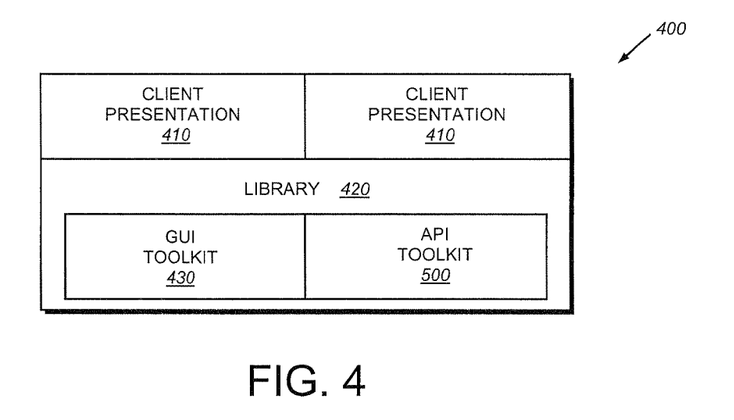
FIG. 4 is a schematic block diagram illustrating an architectural infrastructure of a namespace and storage management (NSM) application in accordance with the present invention.

The present invention is directed to the NSM application 400 having an infrastructure configured to enable efficient management of resources in a storage system environment. The NSM application 400 executes on the NSM console 150 and interacts with the NSM server 200 to integrate namespace management and storage management in storage system environment 100. The NSM server, in turn, interacts with one or more remote agents 170 installed on host machines in the environment to convey API function calls (hereinafter "APIs") that enable remote management of the resources. In an alternate embodiment, however, the NSM application can interact directly with machines hosting the remote agents. As noted, the NSM application (and NSM console) cooperates with the NSM server and remote agent to create the integrated management framework 300 that provides an underlying infrastructure that supports various heterogeneous storage access protocols within a single, logical namespace service.

In the illustrative embodiment, the NSM application 400 is a "lightweight" JAVA-based client application executing on the NSM console 150, which is embodied as a computer having, e.g., a Windows, Linux or Solaris operating system platform. The NSM application 400 is illustratively a single process that, as a JAVA-based application, is characterized by a plurality of threads that can be easily ported to multi-platform instantiations. However, the NSM application is "lightweight" in that it does not require a persistent database and substantially all operations involve APIs executed on other host machines and servers.

Figure 5:
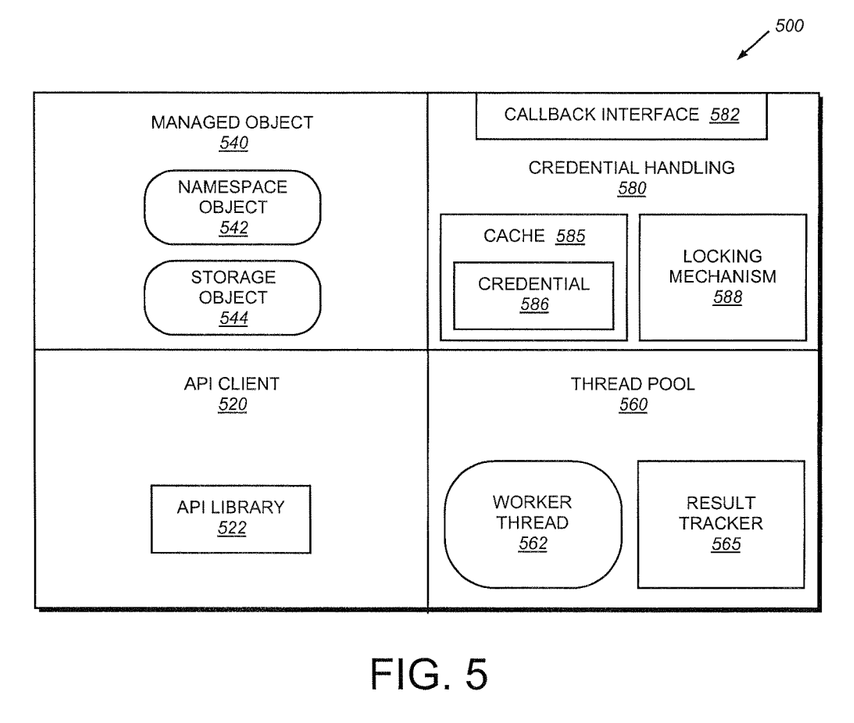
FIG. 5 is a schematic block diagram of an application programming interface (API) toolkit of the NSM application in accordance with the present invention.

FIG. 4 is a schematic block diagram illustrating an architectural infrastructure of the NSM application 400 in accordance with the present invention. The NSM application infrastructure comprises one or more client presentation layers 410 disposed over a library layer 420 that is embodied as graphical user interface (GUI) and application programming interface (API) components. The client presentation layers 410 may be directed to various GUI level presentations, such as storage management and namespace management. To facilitate support for various client presentation layers, the library layer 420 is apportioned into a GUI toolkit 430 configured to produce reusable GUI components, such as dialog boxes (dialogs), and an API toolkit 500 configured to produce reusable API components that, in the illustrative embodiment, are directed to namespace and storage management functions. As described herein, the API toolkit 500 handles thread management, as well as API processing and communication with the NSM server 200, whereas the GUI toolkit 430 handles the GUI components and their implementations.

Broadly stated, the NSM application 400 spawns a GUI thread that is used by the client presentation layer 410 and GUI toolkit 430 to provide GUI components that enable a user to input, e.g., commands for managing selected objects on various servers 130. The client presentation layer 410 translates the command to an operation and provides the is operation, an operation failure handler and a group of managed objects to the API toolkit 500. The API toolkit 500 processes the operation to generate a plurality of APIs and spawns a plurality of threads ("worker threads") to manage the APIs directed to the managed objects of the group. As used herein, the term "API" denotes a collection of methods/functions ("routines") exposed by, e.g., processes of the integrated management framework 300 to which other processes issue calls. When a problem (failure) arises, the API toolkit 500 calls the operation (API) handler, which may result in the presentation of a GUI component, e.g., a dialog 155, by the client presentation layer 410. Notably, the behavior of the API in light of a failure is specified by the client presentation layer; as such, the API toolkit 500 handles API failures according to functionality provided by the client presentation layer 410.

FIG. 5 is a schematic block diagram of the API toolkit 500 of the NSM application 400 in accordance with the present invention. The API toolkit 500 comprises an API client layer 520, a managed object layer 540, a thread pool layer 560 and a credential handling layer 580, wherein the layers interact and communicate using conventional intra-process message passing techniques. The API client layer 520 illustratively embodies an API library 522 configured to generate APIs used to communicate with the NSM server 200. These APIs are illustratively contained within XML tags and transported to the NSM server in accordance with the communication protocol.

The managed object layer 540 illustratively provides a plurality of templates, e.g., JAVA classes, that describes data and behavior associated with instances of managed objects, as well as interfaces that enable operations on those objects as, e.g., programming constructs. As used herein, a managed object may represent any namespace and/or storage resource that has a backing API on a host machine or server; that is, the managed object may represent any resource for which the machine or server exports APIs for management. To that end, the managed objects comprise managed namespace objects 542 representing, e.g., namespaces, link points and shares, and managed storage objects 544 representing, e.g., servers, volumes, files and disks. The managed object layer 540 interacts with the API client layer 520 to package these managed objects within the XML tags.

The thread pool layer 560 utilizes a plurality of worker threads 562 to process an operation that is apportioned among the threads into manageable APIs directed to the managed objects. This layer 560 of the API toolkit 500 also provides a thread pooling function that controls the number of simultaneously executing worker threads so as not to consume substantial processing resources (e.g., CPU) on the NSM console 150. Often a user may select a group of managed objects to perform an operation thereon. In such a situation, the user is interested in an overall result of the operation across the group, rather than for each individual object. Accordingly, the thread pool layer further maintains a data structure embodied as a result tracker 565 that is adapted to monitor the progress of the APIs and provide a completion notification (e.g., success or failure) summarizing the thread operation results on the objects. This layer also provides functionality adapted to force time-outs on APIs that would otherwise be subject to arbitrary network delays due to, e.g., non-responsive servers.

The credential handling layer 580 provides a credential collection function that collects user credentials 586 (e.g., user name and password) needed to access the resources "on-demand" using, e.g., an authentication callback interface 582 to a GUI component, e.g., a dialog 155. This layer further maintains the collected credentials 586 in a local cache 585 (note that the NSM console 150 does not persistently store credentials). Caching of the credentials allows the credential handling layer 580 to determine whether previously collected credentials can be used to satisfy pending requests by worker threads 562 for permission to access the resources in accordance with, e.g., a credential sharing function. For example, the credential sharing function may illustratively attempt to resolve all pending credential requests for each server using the cached credentials and prompt a user only when a request cannot be resolved, i.e., when the cached credentials do no include the necessary credential to perform a pending request. Alternatively, the credential sharing function may use one set of cached credentials per server to resolve the requests and only prompt the user on failure to resolve. In addition, the credential handling layer 580 provides a locking mechanism 588 that limits the number of dialogs 155 that may be displayed on the NSM console 150 at a time when collecting credentials.

Specifically, in the illustrative embodiment, the credential handling layer 580 coordinates access by the worker threads 562 to the presentation of a dialog 155 used to collect and share credentials. That is, credential collection involves the use of the dialog that may be displayed by the threads to collect credentials. Each worker thread 562 that manages a failed API may initiate display of the dialog 155 on the NSM console 150 to request the credentials from the user in accordance with the on-demand credential collection function. However, assume the operation provided by the client presentation layer 410 is decomposed into, e.g., hundreds of APIs managed by corresponding worker threads 562. If all of these APIs fail simultaneously, there may be hundreds of dialogs 155 appearing on the NSM console at a time. To obviate this situation, the locking mechanism 588 of the credential handling layer 580 ensures that only a limited number of worker thread 562s interacts with the client presentation layer 410 to control display of a limited number of dialogs 155, e.g., one, at a time on the NSM console 150. In addition, credential sharing allows the user to enter the credentials into the dialog 155 and, for those credentials that may be used to access managed objects on various servers 130, share those credentials among the worker threads 562.

Figure 6:
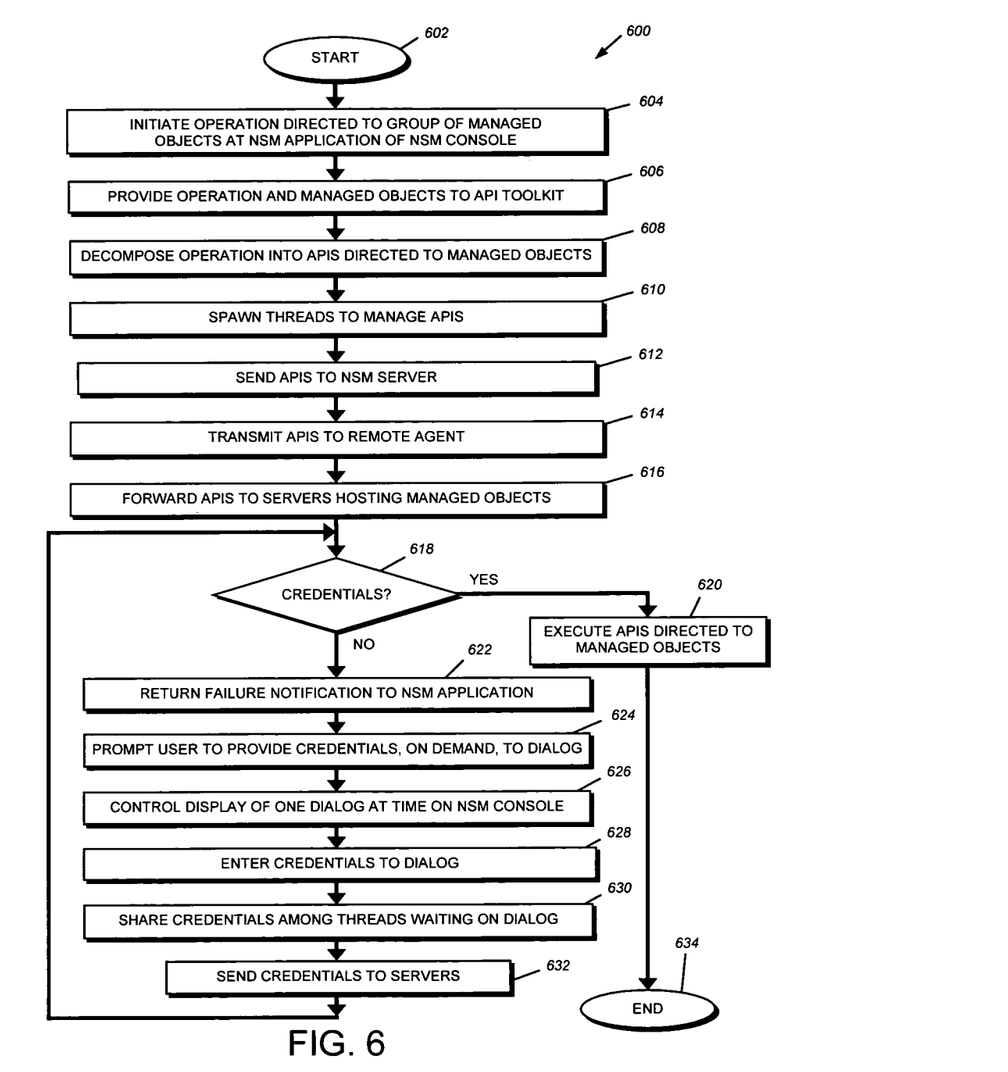
FIG. 6 is a flowchart illustrating operation of the NSM application in accordance with the present invention.

FIG. 6 is a flowchart illustrating operation of the NSM application in accordance with the present invention. The procedure 600 starts at Step 602 and proceeds to Step 604 where a user interacts with the NSM application executing on the NSM console to initiate performance of an operation directed to a group of managed objects, e.g., units of storage, hosted by a plurality of servers. Assume that the operation manipulates the units of storage (e.g., CIFS shares) exported by operating systems executing on the servers. In Step 606, the client presentation layer provides the operation and an indication of the managed objects to the API toolkit. In Step 608, the managed object layer and thread pool layer cooperate to apportion (decompose) the operation into a plurality of APIs directed to the managed objects and, in Step 610, spawn one or more worker threads to manage the APIs. In Step 612, the API client layer formats and sends the APIs within XML tags to the NSM server using the communication protocol. The NSM server illustratively processes the APIs in a manner that, e.g., translates those APIs into additional APIs that initiate actions by one or more remote agents directed to the managed objects.

In Step 614, the NSM server transmits the APIs to the remote agent and, in Step 616, the remote agent forwards APIs to the servers hosting the managed objects. Note that the remote agent communicates with an appropriate storage access protocol server (e.g., a CIFS server) of the operating system on each server using (e.g., Win32 API) remote procedure calls (RPCs) over the network. In Step 618, a determination is made as to whether user credentials are provided to permit access to the managed objects. Note also that this determination may be needed because the credentials are simply unavailable (empty) or because an attempt to execute an API against a server using available credentials may fail (due to bad/stale credentials). If the credentials are (successfully) provided, the servers execute the APIs directed to the managed objects in Step 620 and the procedure ends at Step 634. However, if user credentials are not provided (or if an API attempt fails because the credentials provided are bad/stale), in Step 622 a failure notification is returned to the NSM application (via the NSM server) for each attempted RPC communication between the agent and server, indicating failure of the API due to missing user credentials.

In Step 624, the credential handling layer of the API toolkit cooperates with the client presentation layer to prompt the user, on-demand, to provide its credentials (permission) to access the managed objects on the server. Furthermore, the credential handling layer ensures that, e.g., only one worker thread interacts with the client presentation layer to control display of only one dialog at a time on the NSM console (Step 626). Illustratively, control of the dialog is not passed off to another worker thread that is waiting on credential collection until the current thread completes such collection. In Step 628, the user enters its credentials to the dialog and, in Step 630, the credential handling layer shares, where appropriate, those credentials among worker threads waiting on the dialog. In Step 632, the API client layer formats and sends the credentials (with APIs, if needed) to the servers (via the NSM server and remote agents) to enable execution of the APIs on the managed objects and the procedure returns to Step 618.

While there has been shown and described an illustrative embodiment of an NSM application having an infrastructure configured to enable efficient management of resources in a storage system environment, it is to be understood that various other adaptations and modifications may be made within the spirit and scope of the invention. For example, the presentation of a dialog 155 used to collect/share credentials is an illustrative implementation of the credential sharing function of the credential handling layer 580. Here, the actual behavior of this function is specified by the presentation layer 410 and is independent of the library 420. In an alternate implementation, the worker threads 562 may be directed to a file containing the credentials rather than prompting a user with the dialog 155. This alternate behavior is useful for automating execution of the application when interaction with the user is not possible (e.g., automated testing).

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers and/or modules described herein may be implemented in hardware, software, embodied as a computer-readable medium having executable program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system configured to enable management of resources in a storage system environment, the system comprising:

a management server that interacts with a plurality of namespace servers, the management server including a processor and a memory for storing operations executable by the processor;

a management application executing on a management console computer that receives an operation directed to the resources wherein the operation is managed by a plurality of worker threads and the worker threads manage a plurality of routines derived from the operation, the management application that interacts with the management server to integrate namespace management and storage management in the storage system environment, the management application having an infrastructure including at least one client presentation layer disposed over a library layer apportioned into at least one application programming interface (API) toolkit that:

handles API processing and communication with the management server and produce reusable components directed to namespace and storage management functions, the at least one API toolkit cooperating with the client presentation layer to prompt a user for user credentials, to be provided on-demand, to perform the operation upon the resources in the storage system, wherein one worker thread interacts with the client presentation layer to control display of only one dialog at a time on the management console to obtain the user credentials from the user and the one worker thread to share the user credentials among other worker threads, where the user credentials from the one worker thread and the other worker threads is sent to at least a first server and a second server to perform the operation upon the resources; and employs a thread pool layer that utilizes the worker threads to process the operation apportioned among the worker threads into manageable APIs directed to the resources; and a result tracker maintained by the thread pool layer, the result tracker that monitors progress of the manageable APIs and provides a completion notification summarizing thread operation results on the resources.

2. The system of claim 1 wherein the at least one API toolkit comprises an API client layer that is embodied as an API library that generates APIs used to interact with the management server.

3. The system of claim 2 wherein the resources include instances of managed objects and wherein the at least one API toolkit further comprises a managed object layer that provides a plurality of templates that describe data and behavior associated with the managed objects, as well as interfaces that enable operations on those objects.

4. The system of claim 1 wherein the at least one API toolkit comprises a credential handling layer that provides an on-demand credential collection function that collects the user credentials needed to access the resources.

5. The system of claim 4 wherein the management application is a namespace and storage management (NSM) application, the management console computer is a NSM console and the management server is a NSM server.

6. A method for enabling management of resources in a storage system environment, the method comprising:

executing a management application on a management console computer to initiate performance of an operation directed to a group of managed objects, the executed management application enabling interaction with a management server to integrate namespace management and storage management in the storage system environment, the management application having an infrastructure including at least one client presentation layer disposed over a library layer apportioned into at least one application programming interface (API) toolkit, wherein the group of managed objects are units of storage hosted by a plurality of servers;

decomposing the operation into a plurality of routines directed to the group of managed objects;

spawning a plurality of threads on the management application to manage the plurality of routines;

determining that user credentials are not provided to permit access by a user to the group of managed objects;

in response to determining that the user credentials are not provided, prompting the user for the user credentials, to be provided on-demand, to enable execution of the plurality of routines upon the group of managed objects on the plurality of servers, wherein the plurality of threads require the user credentials and one thread of the plurality of threads controls display of only one dialog at a time on the management console computer to obtain the user credentials from the user, wherein the one thread shares the user credentials among other threads, the other threads waiting on the dialog for the credentials to execute the plurality of routines upon the group of managed objects;

sending the user credentials, from the one thread and the other threads, to the plurality of servers, hosting the group of managed objects, the user credentials enabling execution of the plurality of routines on the group of managed objects;

utilizing the at least one API toolkit that handles API processing and communication with the management server, wherein the at least one API toolkit includes a thread pool layer that utilizes the plurality of threads to process the plurality of routines that are apportioned among the plurality of threads into manageable APIs directed to the group of managed objects; and maintaining a result tracker by the thread pool layer, the result tracker monitoring progress of the manageable APIs and providing completion notifications summarizing thread operation results on the managed objects.

7. The method of claim 6 wherein the management application comprises a namespace and storage management (NSM) application and wherein the management console computer comprises an NSM console.

8. The method of claim 7 further comprising:

sending manageable APIs to an NSM server configured to translate the manageable APIs into additional APIs that initiate action by a remote agent directed to the managed objects; and forwarding the additional APIs to servers hosting the managed objects.

9. The method of claim 8 further comprising:

returning a failure notification to the NSM application indicating failure of an API due to user credentials that were not provided, before prompting the user for the user credentials.

10. An apparatus configured to enable management of resources in a storage system environment, the apparatus comprising:

means for executing a management application on a management console computer to initiate performance of an operation directed to a group of managed objects, the executed management application enabling interaction with a management server to integrate namespace management and storage management in the storage system environment, the management application having an infrastructure including at least one client presentation layer disposed over a library layer apportioned into at least one application programming interface (API) toolkit, wherein the group of managed objects are units of storage hosted by a plurality of servers;

means for decomposing the operation into a plurality of routines directed to the group of managed objects;

means for spawning a plurality of threads on the management application to manage the plurality of routines;

means for determining that the user credentials are not provided to permit access by a user to the group of managed objects;

means for prompting the user for the user credentials, to be provided on-demand, to enable execution of the plurality of routines upon the group of managed objects on the plurality of servers, wherein the plurality of the threads require the user credentials and one thread controls display of only one dialog at a time on the management console computer to obtain the user credentials from the user in response to determining that the user credentials are not provided, wherein the one thread shares the user credentials among other threads, the other threads waiting on the dialog for the credentials to execute the plurality of routines upon the group of managed objects;

means for sending the user credentials, from the one thread and the other threads, to the plurality of servers, to enable execution of the plurality of routines on the group of managed objects;

means for utilizing the at least one API toolkit that handles API processing and communication with the management server, wherein the at least one API toolkit includes a thread pool layer that utilizes the plurality of threads to process the plurality of routines that are apportioned among the plurality of threads into manageable APIs directed to the group of managed objects; and means for maintaining a result tracker by the thread pool layer, the result tracker monitoring progress of the manageable APIs and providing completion notifications summarizing thread operation results on the managed objects.

11. A computer readable storage medium containing executable program instructions executed by a processor, comprising:

program instructions that execute a management application on a management console computer to initiate performance of an operation directed to a group of managed objects, the executed management application enabling interaction with a management server to integrate namespace management and storage management in the storage system environment, the management application having an infrastructure including at least one client presentation layer disposed over a library layer apportioned into at least one application programming interface (API) toolkit, wherein the group of managed objects are units of storage hosted by a plurality of servers;

program instructions that decompose the operation into a plurality of routines directed to the group of managed objects;

program instructions that spawn a plurality of threads on the management application to manage the plurality of routines;

program instructions that determine user credentials are not provided to permit a user to access the group of managed objects;

program instructions that, in response to determining that the user credentials are not provided, prompt a user for the user credentials, to be provided on-demand, to perform the plurality of routines upon the group of managed objects on the plurality of servers, wherein one thread controls display of only one dialog at a time on the management console computer to obtain the user credentials, wherein the one thread shares the user credentials among other threads, the other threads waiting on the dialog for the credentials to perform the plurality of routines upon the group of managed objects;

program instructions that send the user credentials, from the one thread and the other threads, to the plurality of servers, to enable execution of the plurality of routines on the group of managed objects;

program instructions that utilize the at least one API toolkit that handles API processing and communication with the management server, wherein the at least one API toolkit includes a thread pool layer that utilizes the plurality of threads to process the plurality of routines that is apportioned among the plurality of threads into manageable APIs directed to the group of managed objects; and program instructions that maintain a result tracker by the thread pool layer, the result tracker monitoring progress of the manageable APIs and providing a completion notifications summarizing thread operation results on the managed objects.

12. The method of claim 6 wherein the managed object comprises one or more shares.

13. The method of claim 6, further comprising:

sending the routines to the management server, the management server including a processor configured to process the routines;

translating, by the management server, the routines into additional routines, the additional routines configured to initiate an action by a remote agent directed to the managed objects; and forwarding the additional routines to the plurality of servers hosting the managed objects.

14. The apparatus of claim 10, further comprising:

means for sending the routines to the management server, the management server including a processor configured to process the routines;

means for translating the routines into additional routines, the additional routines configured to initiate an action by a remote agent directed to the managed objects; and means for forwarding the additional routines to the plurality of servers hosting the managed objects.

15. The computer readable storage medium of claim 11 further comprising:

program instructions that send the routines to the management server, the management server configured to process the routines;

program instructions that translate the routines into additional routines, the additional routines configured to initiate an action by a remote agent directed to the managed objects; and program instructions that forward the additional routines to the plurality of servers hosting the managed objects.

* * * * *

UNITED STATES PATENT AND TRADEMARK OFFICE
CERTIFICATE OF CORRECTION

| | | |
|---|---|---|
| PATENT NO. | : 8,635,247 B1 | Page 1 of 1 |
| APPLICATION NO. | : 11/414593 | |
| DATED | : January 21, 2014 | |
| INVENTOR(S) | : Steven R. Klinkner | |

It is certified that error appears in the above-identified patent and that said Letters Patent is hereby corrected as shown below:

In the Specification:
Col. 4, line 19:
~~agement framework that to may be advantageously used with~~ should read
agement framework that may be advantageously used with Col. 5, line 34:
~~tem executing on a DFS server, the invention dew scribed~~ should read
tem executing on a DFS server, the invention described Col. 8, line 8:
~~ments the basic is namespace; the NSM server 200 provides a~~ should read
ments the basic namespace; the NSM server 200 provides Col. 10, line 2:
~~translates the command to an operation and provides the is~~ should read
translates the command to an operation and provides the Signed and Sealed this
Thirteenth Day of May, 2014

Michelle K. Lee
*Deputy Director of the United States Patent and Trademark Office*